United States Patent
Hahm et al.

(10) Patent No.: US 8,138,824 B2
(45) Date of Patent: Mar. 20, 2012

(54) RECURSIVE DEMODULATION APPARATUS AND METHOD

(75) Inventors: Young Kwon Hahm, Daejeon (KR); Eun Sook Jin, Daejeon (KR); Yun Jeong Song, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 12/744,837

(22) PCT Filed: Jul. 29, 2008

(86) PCT No.: PCT/KR2008/004402
§ 371 (c)(1),
(2), (4) Date: May 26, 2010

(87) PCT Pub. No.: WO2009/069876
PCT Pub. Date: Jun. 4, 2009

(65) Prior Publication Data
US 2010/0301931 A1    Dec. 2, 2010

(30) Foreign Application Priority Data

Nov. 26, 2007  (KR) .................. 10-2007-0120790

(51) Int. Cl.
*H03D 3/00* (2006.01)
*H04L 27/22* (2006.01)
(52) U.S. Cl. ........................................ 329/304; 375/329
(58) Field of Classification Search .......... 329/304–310; 375/261, 279–284, 329–333
See application file for complete search history.

(56) References Cited

U.S. PATENT DOCUMENTS

| 2004/0032842 | A1* | 2/2004 | Mesecher et al. ............. 370/335 |
| 2004/0228391 | A1 | 11/2004 | Sommer et al. |
| 2005/0122895 | A1 | 6/2005 | Zhou et al. |

FOREIGN PATENT DOCUMENTS

| KR | 1020030097203 | 12/2003 |
| KR | 1020070010324 | 1/2007 |

* cited by examiner

*Primary Examiner* — David Mis
(74) *Attorney, Agent, or Firm* — Nelson Mullins Riley & Scarborough LLP; EuriHoon Lee, Esq.

(57) ABSTRACT

A recursive demodulation apparatus is provided. The recursive demodulation apparatus, including: a segment generation unit dividing data symbols with a residual frequency or phase error into a predetermined number of data symbols, and generating a plurality of segments, each of the plurality of segments including the predetermined number of data symbols; and a phase error correction unit sequentially correcting a phase error of each of the data symbols, included in the each of the plurality of segments, for each segment.

10 Claims, 5 Drawing Sheets

[Fig. 1]
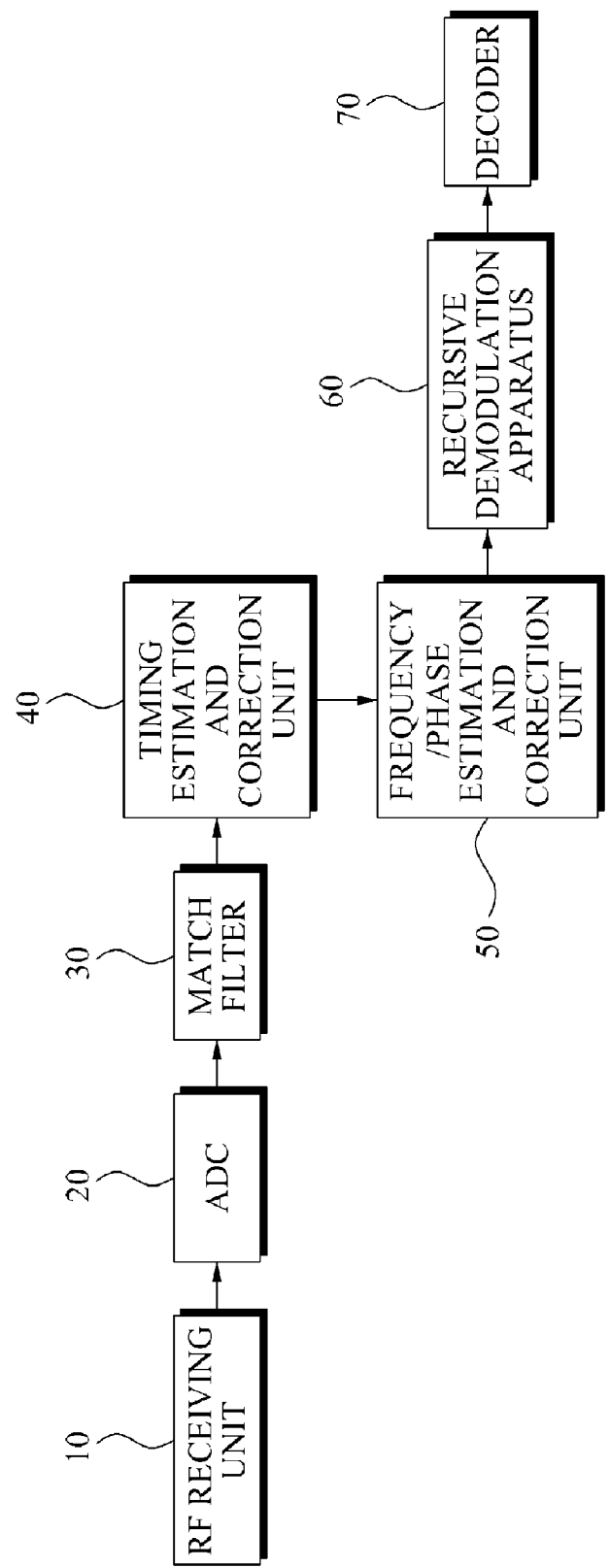

[Fig. 2]
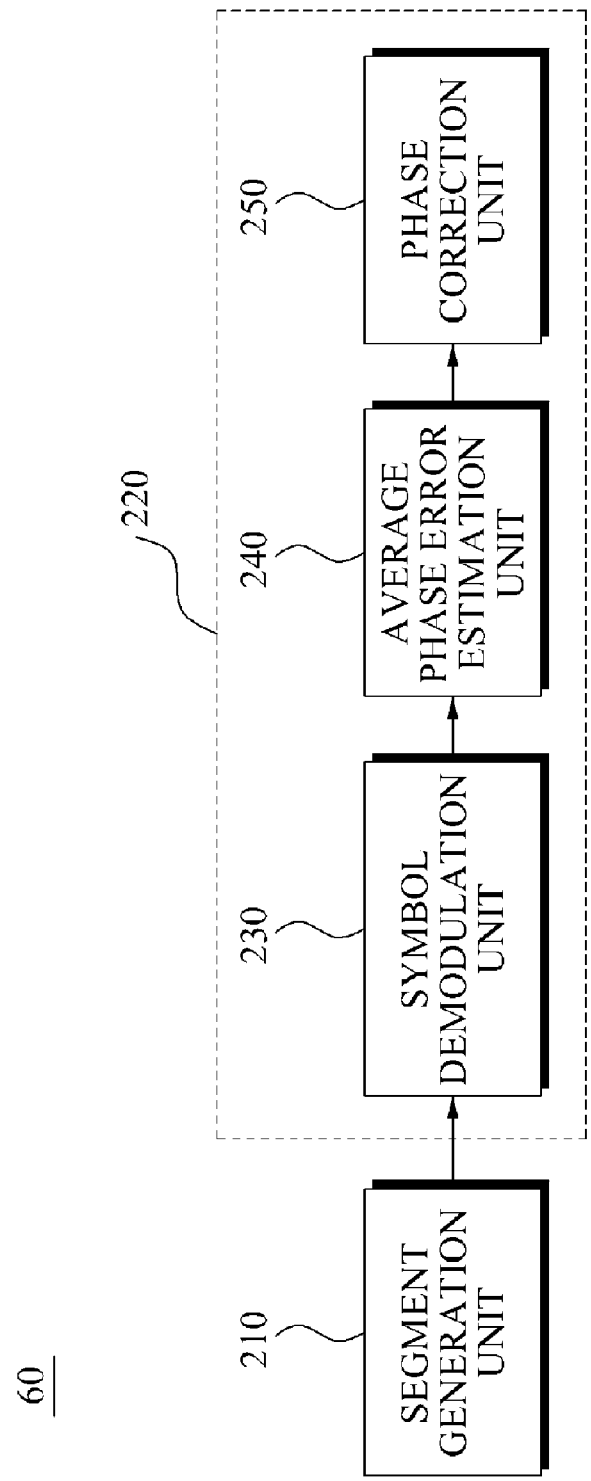

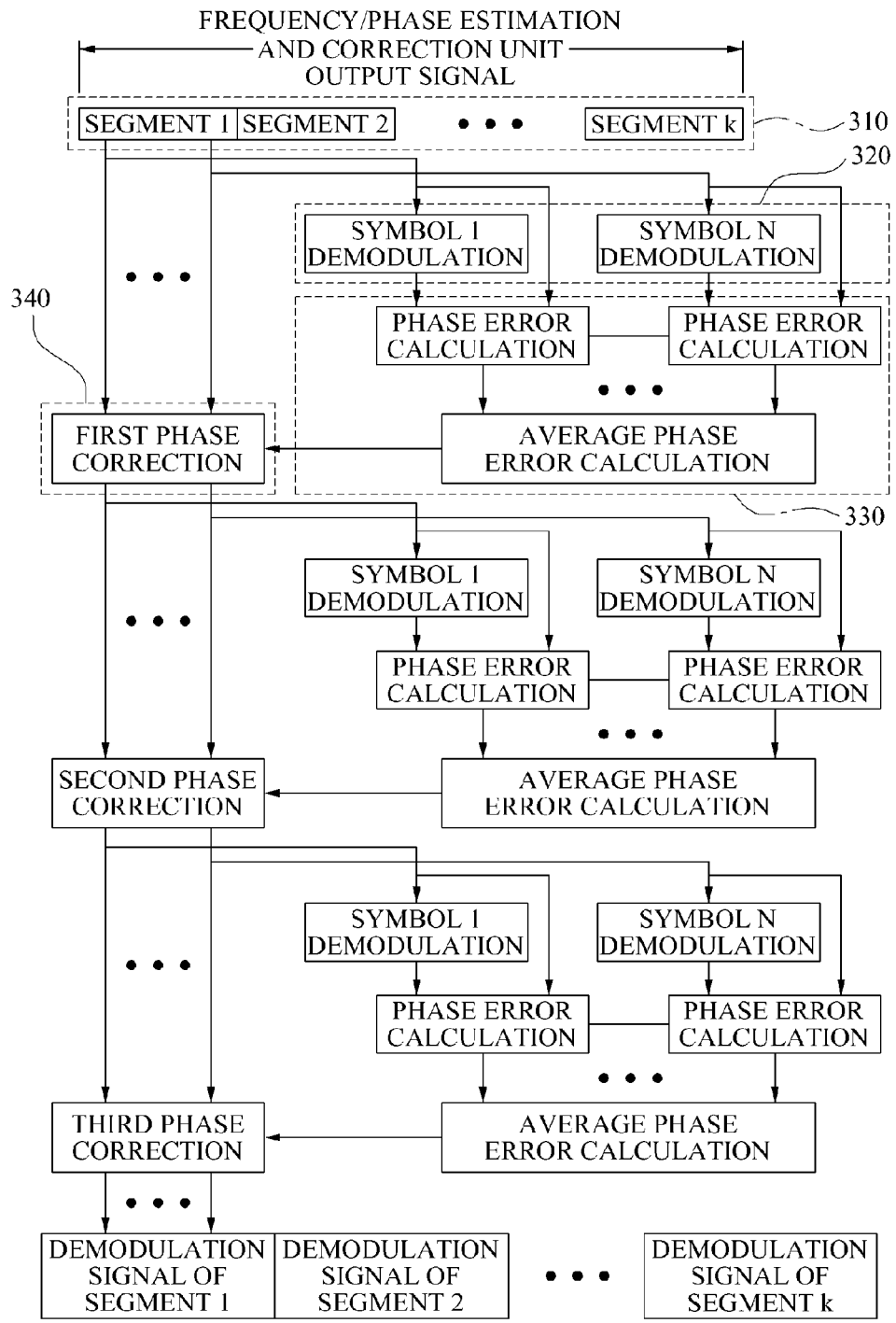
[Fig. 3]

[Fig. 4]
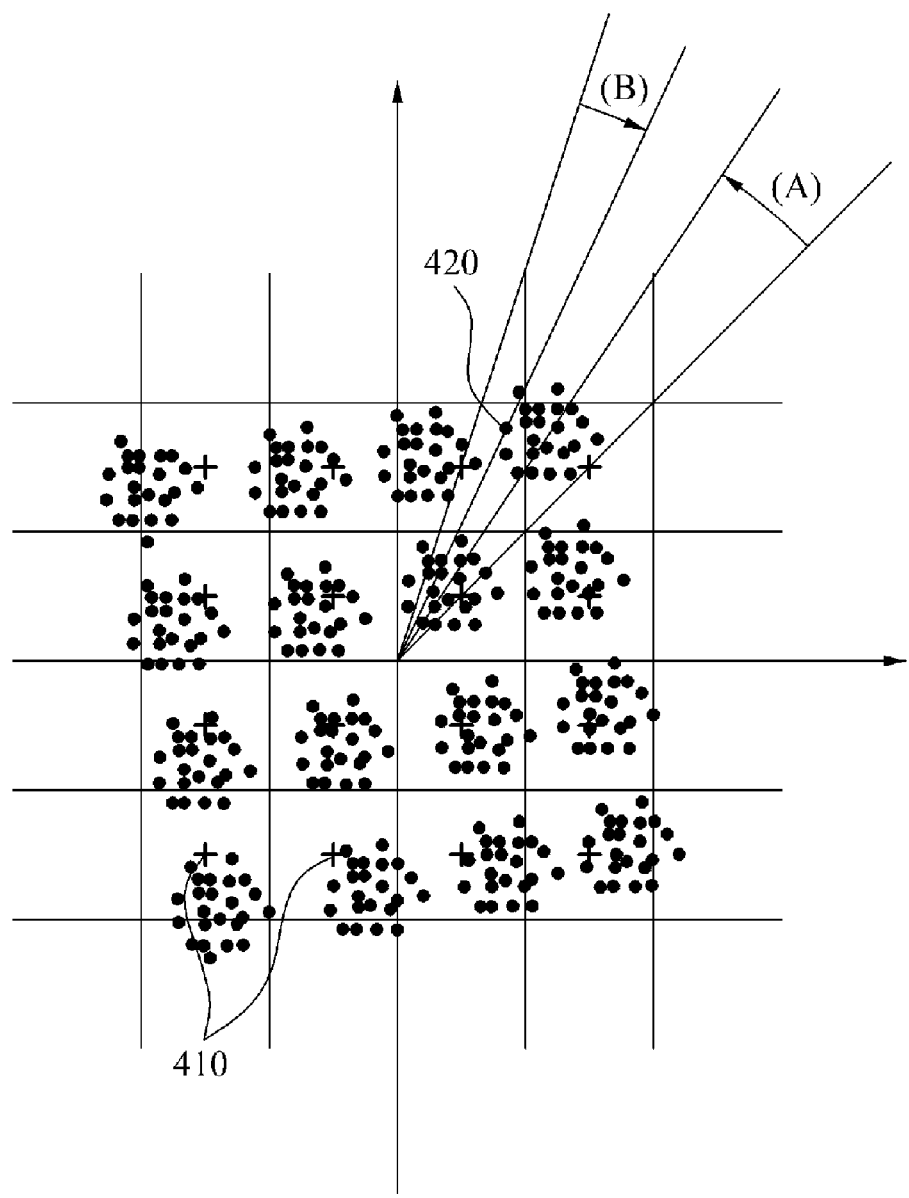

[Fig. 5]
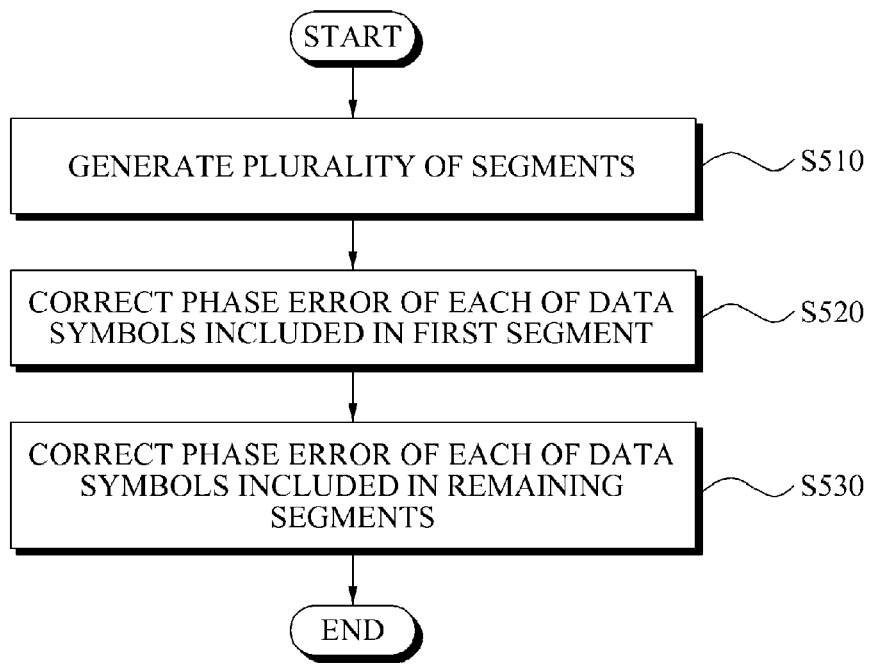
[Fig. 6]
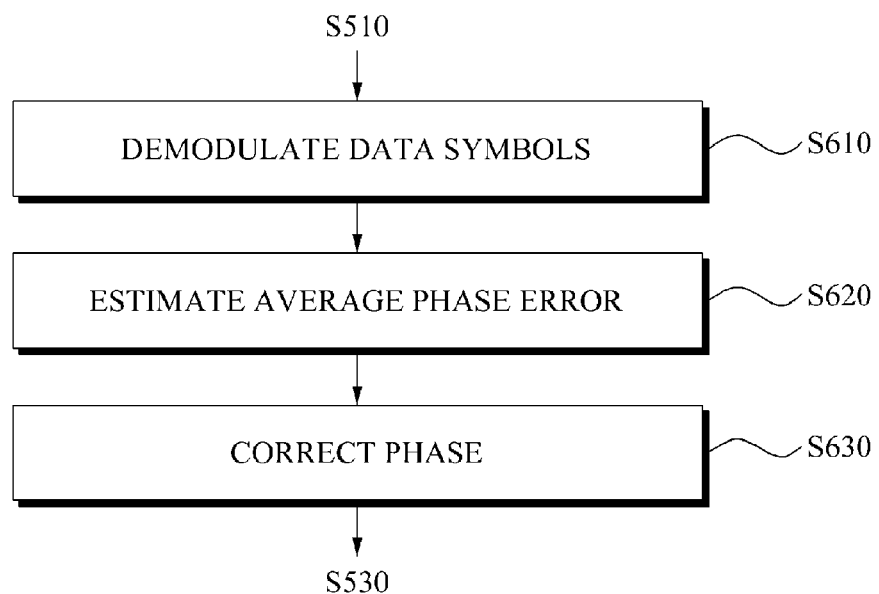

RECURSIVE DEMODULATION APPARATUS AND METHOD

RELATED APPLICATIONS

This application is a 35 U.S.C. §371 national stage filing of PCT Application No. PCT/KR2008/004402 filed on Jul. 29, 2008, which claims priority to, and the benefit of, Korean Patent Application No. 10-2007-0120790 filed on Nov. 26, 2007. The contents of the aforementioned applications are hereby incorporated by reference.

TECHNICAL FIELD

The present invention relates to a recursive demodulation apparatus and method which efficiently corrects a residual frequency/phase error when the residual frequency/phase error exists after a synchronization of a receiving system in a burst mode digital communication.

This work was supported by the IT R&D program of MIC/ IITA. [2006-S-019-02, The development of digital cable transmission and receive system for 1 Gbps downstream]

BACKGROUND ART

In a burst transmission, a short preamble is attached and transmitted at a beginning of burst transmission, and a receiving unit performs a timing synchronization, frequency synchronization, phase synchronization, and the like for each burst using the short preamble to detect a signal.

However, synchronization may not be accurately performed in a poor communication environment such as an environment with a low signal to noise ratio (SNR), although it depends on a synchronization method. Accordingly, a residual frequency/phase error significantly remains.

Due to the residual frequency/phase error, a signal outside of a signal mapping grid section where a signal is to be mapped may occur, and thus an error rate when detecting a signal based on a hard decision may increase.

Also, instead of an error correction method in a conventional art, a method of estimating a frequency/phase error using open symbols, inserted in a burst symbol row, is used to precisely estimate a frequency/phase error in a data area. The error correction method in the conventional art inserts an open symbol in only a beginning of a burst, obtains an estimation value of a frequency/phase error, and corrects a frequency/phase error of remaining data of the burst using the estimation value.

In this case, a frequency/phase error estimation with respect to an open symbol of an end of a burst is required to stand by for frequency/phase error estimation with respect to a beginning of burst. Accordingly, a storage device to store all symbols is required, detection may be delayed until an end of burst is processed, and transmission efficiency may decrease.

To overcome the above-described disadvantages, a technology which removes a phase error in a data symbol by estimating a phase using a pilot symbol and demodulated symbol, that is, a technology which feedbacks a symbol demodulation result in a symbol unit for a phase error calculation, has been provided. However, in the technology described above, a low SNR may cause error propagation, and thus performance may be significantly deteriorated.

Thus, a recursive demodulation apparatus and method which efficiently removes a residual frequency/phase error through a recursive demodulation in a predetermined signal block (segment) with respect to a data section of burst signal is required.

DISCLOSURE OF INVENTION

Technical Problem

The present invention provides a recursive demodulation apparatus and method which may improve a performance of a signal demodulation even when a residual frequency/phase error significantly remains, and enable a receiving system to use a simple frequency/phase synchronization method, as opposed to a complex synchronization method to improve a synchronization performance.

The present invention also provides a recursive demodulation apparatus and method which detects a signal in a segment unit in a recursive way, and thereby do not require a large storage device and do not cause a significant detection delay in view of a frequency/phase synchronization process and demodulation of a receiving system.

Technical Solution

According to an aspect of the present invention, there is provided a recursive demodulation apparatus, including: a segment generation unit dividing data symbols with a residual frequency or phase error into a predetermined number of data symbols, and generating a plurality of segments, each of the plurality of segments including the predetermined number of data symbols; and a phase error correction unit sequentially correcting a phase error of each of the data symbols, included in the each of the plurality of segments, for each segment.

The phase error correction unit again receives the data symbols corrected and outputted by the phase error correction unit, and corrects the phase error of each of the predetermined number of data symbols at least twice in a same way.

The phase error correction unit includes: a symbol demodulation unit receiving and demodulating the data symbols; an average phase error estimation unit calculating a phase error of each of the demodulated data symbols, and estimating an average phase error using the calculated phase errors; and a phase correction unit correcting a phase of each of the demodulated data symbols using the average phase error.

According to an aspect of the present invention, there is provided a recursive demodulation method, including: dividing data symbols with a residual frequency or phase error into a predetermined number of data symbols, and generating a plurality of segments, each of the plurality of segments including the predetermined number of data symbols; correcting a phase error of each of the predetermined number of data symbols included in a first segment of the plurality of segments; and sequentially correcting a phase error of each of the data symbols, included in remaining segments of the plurality of segments, for each segment.

BRIEF DESCRIPTION OF THE DRAWINGS

FIG. 1 is a block diagram illustrating an example of a receiving system including a recursive demodulation apparatus according to an embodiment of the present invention;

FIG. 2 is a block diagram illustrating a configuration of a recursive demodulation apparatus according to an embodiment of the present invention;

FIG. 3 is a diagram illustrating a signal process operation of a recursive demodulation apparatus according to an embodiment of the present invention;

FIG. 4 is a diagram illustrating a signal constellation of 16 QAM data symbols included in each segment in a recursive demodulation apparatus according to an embodiment of the present invention;

FIG. 5 is a flowchart illustrating a recursive demodulation method according to an embodiment of the present invention; and FIG. 6 is a flowchart illustrating a first segment phase error correction operation of a recursive demodulation method according to an embodiment of the present invention.

MODE FOR THE INVENTION

Hereinafter, embodiments of the present invention are described in detail by referring to the figures.

FIG. 1 is a block diagram illustrating an example of a receiving system including a recursive demodulation apparatus according to an embodiment of the present invention.

Referring to FIG. 1, the example of the receiving system including the recursive demodulation apparatus 60 includes a radio frequency (RF) receiving unit 10, analog to digital converter (ADC) 20, match filter 30, timing estimation and correction unit 40, frequency/phase estimation and correction unit 50, recursive demodulation apparatus 60, and decoder 70.

The receiving system has a configuration of an All Digital Feed-forward receiving system.

The RF receiving unit 10 receives and tunes an RF signal of a desired band, and downconverts the RF signal to a baseband.

The ADC 20 performs sampling with respect to an analog signal outputted from the RF receiving unit 10 at every predetermined period, and converts the sampled analog signal to a digital signal.

The match filter 30 reduces noise of the digital signal outputted from the ADC 20.

The timing estimation and correction unit 40 estimates and corrects symbol timing of the signal outputted from the match filter 30.

In this instance, when the sampling period is not an integer number of times greater than a transmitted symbol period, the timing estimation and correction unit 40 estimates a difference and corrects timing using an interpolation scheme.

The frequency/phase estimation and correction unit 50 estimates and corrects a frequency/phase offset with respect to the signal, outputted from the timing estimation and correction unit 40, using an open preamble data row. The open preamble data row is included in burst data.

The recursive demodulation apparatus 60 performs demodulation removing a residual frequency/phase offset which is not corrected by the frequency/phase estimation and correction unit 50.

The decoder 70 is configured to be a channel decoder. The decoder 70 receives a signal including an error from the recursive demodulation apparatus 60, corrects the error and outputs.

FIG. 2 is a block diagram illustrating a configuration of a recursive demodulation apparatus according to an embodiment of the present invention.

Referring to FIG. 2, the recursive demodulation apparatus 60 includes a segment generation unit 210 and a phase error correction unit 220. The segment generation unit 210 divides data symbols with a residual frequency or phase error into a predetermined number of data symbols, and generates a plurality of segments. Each of the plurality of segments includes the predetermined number of data symbols. The phase error correction unit 220 sequentially corrects a phase error of each of the data symbols, included in the each of the plurality of segments, for each segment.

The segment generation unit 210 divides the data symbols outputted from a frequency/phase estimation and correction unit 50 into the predetermined number of data symbols, and generates the plurality of segments. Each of the plurality of segments includes the predetermined number of data symbols, and the data symbols are data parts of a burst signal including a preamble and data.

Specifically, when a significant amount of residual frequency offset exists, a phase error of the burst signal is insignificant at a beginning of the burst signal, the phase error gradually increases, and the phase error is the greatest at an end. Accordingly, the dividing of the data of the burst signal for each segment enables the phase error to be effectively estimated and a signal detection delay to be reduced.

The phase error correction unit 220 sequentially corrects the phase error of each of the data symbols, included in the each of the plurality of segments, for each segment.

In this instance, the phase error correction unit 220 may again receive the data symbols corrected and outputted by the phase error correction unit 220, and correct the phase error of each of the predetermined number of data symbols at least twice in a same way.

Also, the phase error correction unit 220 may include a symbol demodulation unit 230, average phase error estimation unit 240, and phase correction unit 250. The symbol demodulation unit 230 receives and demodulates the data symbols. The average phase error estimation unit 240 calculates a phase error of each of the demodulated data symbols, and estimates an average phase error using the calculated phase errors. The phase correction unit 250 corrects a phase of each of the demodulated data symbols using the average phase error.

The symbol demodulation unit 230 receives and demodulates the data symbols included in each of the segments.

In this instance, the symbol demodulation unit 230 may include a symbol demapper. The symbol demapper demaps the demodulated data symbols to a point which is the closest to any one of mapping determination points of a signal constellation.

The average phase error estimation unit 240 calculates the phase error of each of the data symbols demodulated and outputted from the symbol demodulation unit 230. Also, the average phase error estimation unit 240 estimates an average phase error of data symbols included in a corresponding segment using the calculated phase errors.

In this instance, the phase error of each of the demodulated data symbols may be estimated based on a phase difference between a mapping point before each of the data symbols is demodulated and a mapping point after each of the data symbols is demodulated.

That is, since a noise element is included in each of the data symbols, an accuracy of each phase error is low. Accordingly, the average phase error for each segment may be relatively accurately estimated by obtaining an average value of errors of entire data symbols included in the segments.

The phase correction unit 250 corrects a phase of each of the demodulated data symbols using the average phase error estimated by the average phase error estimation unit 240.

FIG. 3 is a diagram illustrating a signal process operation of a recursive demodulation apparatus according to an embodiment of the present invention.

Referring to FIG. 3, a segment generation unit 310 divides data symbols, outputted from a frequency/phase estimation and correction unit 50, into N data symbols. Also, the segment generation unit 310 generates k segments. Each of the k segments includes the N data symbols.

Each of the N data symbols included in a segment one is demodulated by a symbol demodulation unit 320. The segment one is a first segment of the k segments.

That is, the N data symbols included in the segment one is demapped by a symbol demapper to a point which is the closest to any one of mapping determination points of a signal constellation. The symbol demapper is included in the symbol demodulation unit 320.

A phase error of each of the demodulated N data symbols is calculated by an average phase error estimation unit 330 based on a phase difference between a mapping point before each of the data symbols is demodulated and a mapping point after each of the data symbols is demodulated.

The average phase error estimation unit 330 estimates an average phase error of the N data symbols, included in the segment one, using the calculated phase error of each of the N data symbols.

A phase correction unit 340 performs a first phase correction with respect to each of the N data symbols using the estimated average phase error.

The N data symbols corrected by the phase correction unit 340 are inputted to the symbol demodulation unit 320 again, and a second phase correction is performed in a same way as the first phase correction.

Also, a third phase correction is performed with respect to the N data symbols where the second phase correction is performed in the same way as the first phase correction.

As described above, a phase error correction is repeatedly performed with respect to the N data symbols, and thus a phase error with respect to each of the N data symbols gradually decreases. Also, when the third phase correction is performed, an error reduction curve is saturated and thus no room for improvement is left.

When the error correction of the segment one is complete, a phase error correction unit corrects a phase error of a subsequent segment. That is, a phase error of every segment to the segment k is sequentially corrected.

FIG. 4 is a diagram illustrating a signal constellation of 16 QAM data symbols included in each segment in a recursive demodulation apparatus according to an embodiment of the present invention.

Referring to FIG. 4, it is illustrated that the 16 QAM data symbols spread due to noise, and rotated in its entirety due to a residual phase error.

In this instance, the data symbols are required to be precisely demapped to a mapping determination point 410 for an accurate signal demodulation. The mapping determination point 410 is a point where the data symbols has been originally mapped when transmitting. However, the accurate signal demodulation may not be performed due to average phase error estimation interference symbols 420 which may not be precisely demapped to the mapping determination point 410 as illustrated in FIG. 4.

Specifically, when an SNR is low, an error of a result of estimating a frequency offset and phase offset in a frequency/phase estimation and correction unit is significant, and thus data symbols which may not be demapped to the point where the data symbols has been originally mapped when transmitting, that is, the average phase error estimation interference symbols 420 illustrated in FIG. 4, exist.

Also, the average phase error estimation interference symbols 420 may cause a phase error B estimated from an incorrect mapping determination point.

That is, it is calculated that a phase error occurs in an opposite direction to a direction where a phase is tilted. Also, when the data symbols are included in a portion of a segment, an average phase error value of the data symbols may be less than an actually desired estimated average phase error A.

Accordingly, when the first phase correction is performed by a recursive demodulation apparatus, a phase error of a corresponding segment decreases. When a second phase correction is performed in a same way as the first phase correction using data symbols where the first phase correction is performed, the phase error further decreases in comparison to the first phase correction. When the phase correction is repeated, data symbols with a smaller frequency/phase error are obtained. Thus, when the phase correction is performed approximately three times, no room for improvement is left.

FIG. 5 is a flowchart illustrating a recursive demodulation method according to an embodiment of the present invention.

Referring to FIG. 5, the recursive demodulation method is performed in operations S510, S520, and S530.

In operation S510, data symbols where a frequency/phase is corrected but a residual frequency/phase error exists are divided into a predetermined number of data symbols, and a plurality of segments are generated. Each of the plurality of segments includes the predetermined number of data symbols, and the data symbols are data part of a burst signal including a preamble and data.

In this instance, when a significant amount of residual frequency offset exists, a phase error of the burst signal is insignificant at a beginning of the burst signal, the phase error gradually increases, and the phase error is the greatest at an end. Accordingly, the dividing of the data of the burst signal for each segment enables the phase error to be effectively estimated and a signal detection delay to be reduced.

In operation S520, a phase error of each of the predetermined number of data symbols, included in a first segment of the plurality of segments, is corrected.

Also, the correcting in operation S520 may include an operation of receiving the data symbols, corrected and outputted when correcting the phase error of each of the predetermined number of data symbols included in the first segment, again and correcting the phase error of each of the predetermined number of data symbols at least twice in a same way.

In operation S530, a phase error of each of the data symbols, included in remaining segments of the plurality of segments excluding the first segment, is sequentially corrected for each segment.

FIG. 6 is a flowchart illustrating a first segment phase error correction operation of a recursive demodulation method according to an embodiment of the present invention.

Referring to FIG. 6, the first segment phase error correction operation is performed in operations S610, S620, and S630.

In operation S610, the data symbols included in the first segment are received and demodulated.

Also, the receiving and demodulating in operation S610 may include an operation of demapping the data symbols to a point which is the closest to any one of mapping determination points of a signal constellation.

In operation S620, a phase error of each of the data symbols demodulated in operation S610 is calculated, and an average phase error is estimated using the calculated phase error.

In this instance, the phase of each of the demodulated data symbols may be estimated based on a phase difference between a mapping point before each of the data symbols is demodulated and a mapping point after each of the data symbols is demodulated.

That is, since a noise element is included in each of the data symbols, an accuracy of each phase error is low. Accordingly, the average phase error for each segment may be relatively accurately estimated by obtaining an average value of errors of entire data symbols included in the segments.

In operation S630, a phase of the data symbols included in the first segment is corrected using the average phase error estimated in operation S620.

As described above, a phase error correction is repeatedly performed with respect to each data symbol in a single segment, and thus data symbols with a smaller frequency/phase error are obtained. The single segment includes the data symbols with a residual frequency/phase error. Accordingly, when the phase correction is performed approximately three times, no room for improvement is left.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an embodiment of the present invention, a recursive demodulation apparatus and method may improve a performance of a signal demodulation even when a residual frequency/phase error significantly remains, and enable a receiving system to use a simple frequency/phase synchronization method, as opposed to a complex synchronization method to improve a synchronization performance.

Also, according to an embodiment of the present invention, a recursive demodulation apparatus and method detects a signal in a segment unit in a recursive way, and thereby do not require a large storage device and do not cause a significant detection delay in view of a frequency/phase synchronization process and demodulation of a receiving system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A recursive demodulation apparatus, comprising:
    a segment generation unit dividing data symbols with a residual frequency or phase error into a predetermined number of data symbols, and generating a plurality of segments, each of the plurality of segments including the predetermined number of data symbols; and
    a phase error correction unit sequentially correcting a phase error of each of the data symbols, included in the each of the plurality of segments, for each segment.

2. The recursive demodulation apparatus of claim 1, wherein the phase error correction unit again receives the data symbols corrected and outputted by the phase error correction unit, and corrects the phase error of each of the predetermined number of data symbols at least twice in a same way.

3. The recursive demodulation apparatus of claim 1, wherein the phase error correction unit comprises:
    a symbol demodulation unit receiving and demodulating the data symbols;
    an average phase error estimation unit calculating a phase error of each of the demodulated data symbols, and estimating an average phase error using the calculated phase error; and
    a phase correction unit correcting a phase of each of the demodulated data symbols using the average phase error.

4. The recursive demodulation apparatus of claim 3, wherein the symbol demodulation unit comprises a symbol demapper demapping the demodulated data symbols to a point which is the closest to any one of mapping determination points of a signal constellation.

5. The recursive demodulation apparatus of claim 3, wherein the phase error of each of the demodulated data symbols is estimated based on a phase difference between a mapping point before each of the data symbols is demodulated and a mapping point after each of the data symbols is demodulated.

6. A recursive demodulation method, comprising:
    dividing data symbols with a residual frequency or phase error into a predetermined number of data symbols, and generating a plurality of segments, each of the plurality of segments including the predetermined number of data symbols;
    correcting a phase error of each of the predetermined number of data symbols included in a first segment of the plurality of segments; and
    sequentially correcting a phase error of each of the data symbols, included in remaining segments of the plurality of segments, for each segment.

7. The recursive demodulation method of claim 6, wherein the correcting of the phase error of each of the predetermined number of data symbols comprises:
    receiving the data symbols corrected and outputted when correcting the phase error of each of the predetermined number of data symbols included in the first segment of the plurality of segments again, and correcting the phase error of each of the predetermined number of data symbols at least twice in a same way.

8. The recursive demodulation method of claim 6, wherein the correcting of the phase error of each of the predetermined number of data symbols comprises:
    receiving and demodulating the data symbols included in the first segment;
    calculating a phase error of each of the demodulated data symbols, and estimating an average phase error using the calculated phase error; and
    correcting a phase of each of the demodulated data symbols, included in the first segment, using the average phase error.

9. The recursive demodulation method of claim 8, wherein the receiving and demodulating comprises:
    demapping the data symbols to a point which is the closest to any one of mapping determination points of a signal constellation.

10. The recursive demodulation method of claim 8, wherein the phase of each of the demodulated data symbols is estimated based on a phase difference between a mapping point before each of the data symbols is demodulated and a mapping point after each of the data symbols is demodulated.

* * * * *